(12) United States Patent
Carper et al.

(10) Patent No.: US 7,028,462 B2
(45) Date of Patent: Apr. 18, 2006

(54) METHOD AND APPARATUS FOR ARRESTING A CRACK WITHIN A BODY

(75) Inventors: Douglas M. Carper, Cincinnati, OH (US); Michael L. Millard, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 182 days.

(21) Appl. No.: 10/703,272

(22) Filed: Nov. 7, 2003

(65) Prior Publication Data

US 2005/0097892 A1  May 12, 2005

(51) Int. Cl.
*F02K 1/80* (2006.01)
(52) U.S. Cl. .................................... 60/230; 60/232
(58) Field of Classification Search .................. 60/230, 60/232
See application file for complete search history.

(56) References Cited

U.S. PATENT DOCUMENTS

| | | | |
|---|---|---|---|
| 4,530,884 A | 7/1985 | Erickson et al. | |
| 4,544,098 A * | 10/1985 | Warburton | 239/127.3 |
| 4,780,432 A | 10/1988 | Minford et al. | |
| 4,835,831 A | 6/1989 | Melton et al. | |
| 4,837,230 A | 6/1989 | Chen et al. | |
| 4,916,092 A | 4/1990 | Tiegs et al. | |
| 4,994,416 A | 2/1991 | Tiegs et al. | |
| 5,125,557 A | 6/1992 | Tanaka et al. | |
| 5,137,852 A | 8/1992 | Morgan et al. | |
| 5,514,474 A | 5/1996 | Morgan et al. | |
| 5,584,173 A | 12/1996 | Lybarger | |
| 5,839,663 A * | 11/1998 | Broadway et al. | 239/265.35 |
| 6,143,107 A | 11/2000 | Hounsel et al. | |
| 6,240,720 B1 * | 6/2001 | Tseng et al. | 239/265.37 |
| 6,338,906 B1 | 1/2002 | Ritland et al. | |
| 6,471,469 B1 | 10/2002 | Toffan et al. | |

FOREIGN PATENT DOCUMENTS

| | | |
|---|---|---|
| EP | 1126221 A1 | 8/2001 |
| EP | 1211406 A1 | 6/2002 |
| WO | WO 99/36682 A1 | 7/1999 |
| WO | WO 2004/106055 A1 | 12/2004 |

* cited by examiner

*Primary Examiner*—Ted Kim
(74) *Attorney, Agent, or Firm*—David Narciso; Sonnenschein Nath & Rosenthal LLP

(57) ABSTRACT

An inseparable assembly includes a body having a plurality of plies stacked in face to face relation and bonded together, wherein each of the plurality of plies includes a ceramic matrix composite material having a first predetermined ductility. The assembly further includes a reinforcement including a metallic wire mesh bonded to said body so that at least a portion of the metallic wire mesh is positioned between two adjacent plies in the body. The metallic wire mesh has a second predetermined ductility greater than the first ductility.

16 Claims, 8 Drawing Sheets

METHOD AND APPARATUS FOR ARRESTING A CRACK WITHIN A BODY

BACKGROUND OF THE INVENTION

The present invention relates generally to ceramic matrix composite materials, and more specifically to a method and apparatus for arresting cracks within ceramic matrix composite materials.

Gas turbine engines typically include a compressor, a combustor, and a turbine. Airflow entering the compressor is compressed and channeled to the combustor, wherein the air is mixed with a fuel and ignited within a combustion chamber to produce combustion gases. The combustion gases are channeled to a turbine that extracts energy from the combustion gases for powering the compressor. One turbine extracts energy from the combustion gases to power the compressor. Other turbines may be used to power an output shaft connected to a load, such as an electrical generator. In some applications, the combustion gases exiting the turbine(s) are channeled through an engine exhaust nozzle to produce thrust for propelling an aircraft in flight.

Some known gas turbine aircraft engines include an engine exhaust nozzle having a variable geometry configuration, wherein a cross-sectional area of the exhaust nozzle is adjustable. Variable geometry exhaust nozzles typically have a plurality of flaps and a plurality of seals mounted circumferentially about a centerline of the exhaust nozzle. The seals are mounted generally between adjacent nozzle flaps, such that the flaps and seals form a generally continuous interior surface that directs a flow of the combustion gases through the exhaust nozzle. As their name implies, the seals seal the spaces between the flaps and shield various components of the exhaust nozzle from high temperatures and high thermal gradients during flow of the combustion gases therein.

To facilitate extending a useful life at high temperature operation, some seals are fabricated from non-metallic composite materials, such as ceramic matrix composite materials. However, even such non-metallic materials experience wear and other damage due to the hostile operating environment of gas turbine engines. For example, cracks may develop within the seals because of high thermal gradients the seals experience during operation. Known methods for arresting such cracks typically include design changes, such as changes to the orientation of individual plies within the seals and thermal relief cuts.

SUMMARY OF THE INVENTION

In one aspect, an inseparable assembly is provided including a body having a plurality of plies stacked in face to face relation and bonded together, wherein each of the plurality of plies includes a ceramic matrix composite material having a first predetermined ductility. The assembly further includes a reinforcement including a metallic wire mesh bonded to said body so that at least a portion of the metallic wire mesh is positioned between two adjacent plies in the body. The metallic wire mesh has a second predetermined ductility greater than the first ductility.

In another aspect, a variable geometry exhaust nozzle is provided for a gas turbine engine having an exhaust centerline. The nozzle includes a plurality of flaps arranged around the exhaust centerline, each of the flaps having a sealing surface, and a plurality of flap seals. Each seal has a body which includes a sealing surface. The body is positioned between a pair of flaps of the plurality of flaps so that the sealing surface of the seal engages the sealing surface of at least one of the adjacent flaps. Each of the bodies includes a plurality of plies stacked and bonded together. At least one of the seal bodies has a reinforcement bonded to the body so that at least a portion of the reinforcement is positioned between two adjacent plies in the body.

In yet another aspect, a method is provided for fabricating a ceramic matrix composite material body having a plurality of plies, wherein each ply of the plurality of plies includes a plurality of reinforcing fibers and a matrix mixture interspersed between the fibers. The method includes the steps of stacking the plurality of plies, positioning a reinforcement comprising a metallic wire mesh between two adjacent plies in the body, and laminating the stack of the plurality of plies and the reinforcement to bond the plurality of plies and the patch together.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
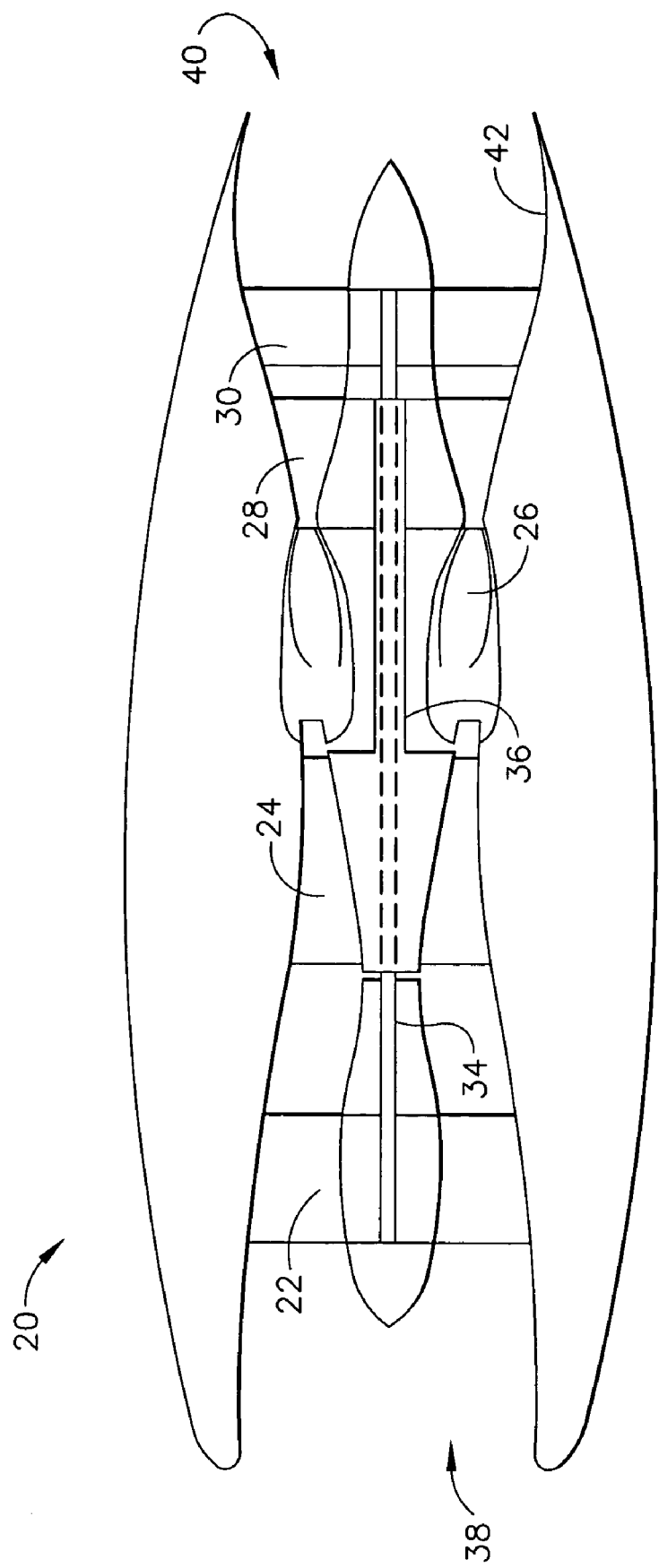
FIG. 1 is a schematic of an exemplary gas turbine engine.

Referring now the to the drawings, FIG. 1 is a schematic of a gas turbine engine 20 including a fan 22, a high pressure compressor 24, and a combustor 26. The engine 20 also includes a high-pressure turbine 28 and a low-pressure turbine 30. The fan 22 and the turbine 30 are coupled by a first shaft 34, and the high-pressure compressor 24 and the turbine 28 are coupled by a second shaft 36. In one embodiment, the engine 20 is a F414 engine commercially available from GE Aircraft Engines, Evendale, Ohio.

In operation, air received through an inlet end 38 of the engine 20 is compressed by the fan 22 and channeled to the high-pressure compressor 24, wherein the compressed air is compressed even further. The highly compressed air from the high-pressure compressor 22 is channeled to the combustor 26, wherein it is mixed with a fuel and ignited to produce combustion gases. The combustion gases are channeled from the combustor 26 to drive the turbines 28 and 30, and exit an outlet end 40 of the engine 20 through an exhaust nozzle assembly 42 to provide thrust.

Figure 2:
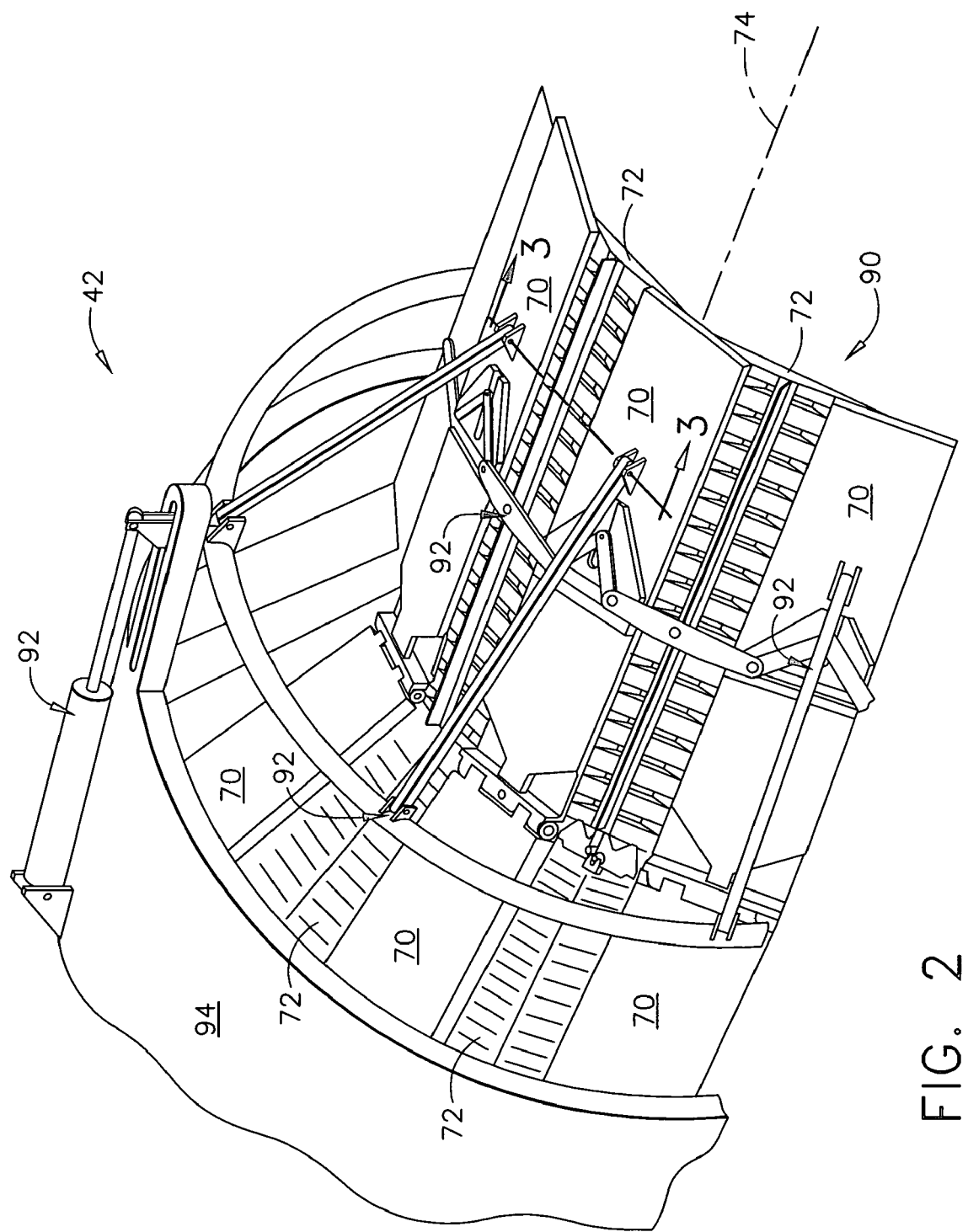
FIG. 2 is a perspective of a portion of the gas turbine engine shown in FIG. 1 illustrating a portion of an exemplary exhaust nozzle assembly.
Figure 3:
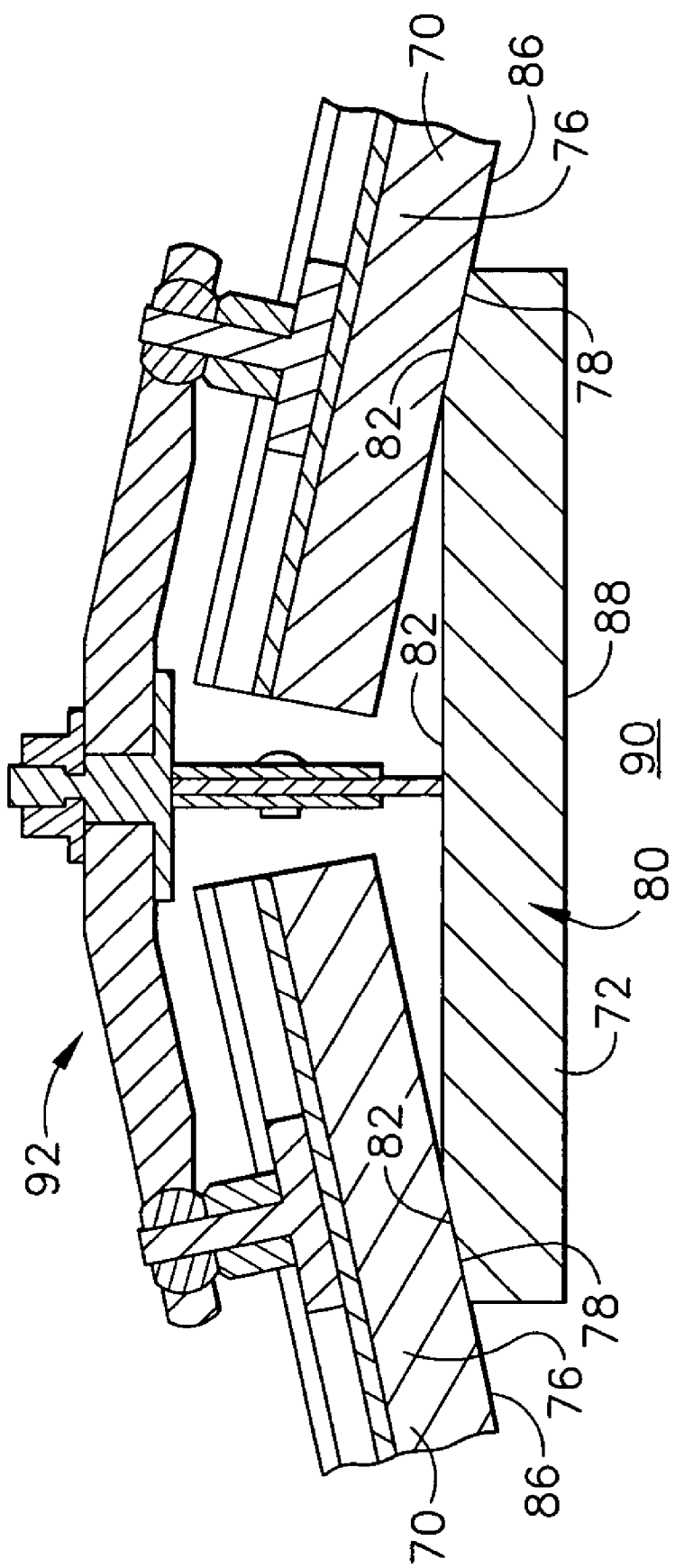
FIG. 3 is a cross section of the exhaust nozzle assembly shown in FIG. 2 taken alone line 3—3 of FIG. 2.

FIG. 2 is a perspective of a portion of the gas turbine engine 20 illustrating a sector of the exhaust nozzle assembly 42. FIG. 3 is a cross section of the exhaust nozzle assembly 42 taken along line 3—3 of FIG. 2. The nozzle assembly 42 includes a plurality of flaps 70 and a plurality of flap seals 72. The flaps 70 and the flap seals 72 are arranged circumferentially around a centerline 74 of the exhaust nozzle assembly 42. Each flap seal 72 is positioned between a pair of adjacent flaps 70 and radially inwardly with respect to the flaps 70, such that a portion of each flap seal 72 overlaps a portion of each adjacent flap 70. More specifically, each flap 70 includes a body 76 having a sealing surface 78, and each flap seal 72 includes a body, generally referred to by the reference numeral 80, having a sealing surface 82. The flap seals 72 overlap adjacent flaps 70 such that during operation of the engine 20 a portion of each flap sealing surface 78 contacts a portion of each corresponding sealing surface 82 generally along an axial length of the flaps 70 and the flap seals 72. In one embodiment, the flap seal bodies 80 are fabricated from a ceramic matrix composite material. In another embodiment, the flap seal bodies 80 are fabricated from an oxide-based ceramic matrix composite material. Additionally, in one embodiment, the flap bodies 76 are fabricated from a ceramic matrix composite material.

Respective radially inner surfaces 86 and 88 of the flaps 70 and the flap seals 72 form a generally continuous interior surface defining an exhaust nozzle orifice 90. The orifice 90 directs a flowpath of gases received from the turbine 30 (shown in FIG. 1) out of the engine outlet end 40 to produce thrust. In the exemplary embodiment, the exhaust nozzle assembly 42 is a variable geometry exhaust nozzle, wherein a cross-sectional area of the nozzle orifice 90 is adjustable. A mounting assembly, generally referred to herein with the reference numeral 92, couples each flap seal 72 to adjacent flaps 70. The assembly 92 is movably coupled to an outer casing 94 of the engine 20 to facilitate adjustment of the cross-sectional area of the orifice 90. Additionally, the assembly 92 allows relative motion between the flaps 70 and the flap seals 72 to facilitate contact between the sealing surfaces 78 and respective sealing surfaces 82, and to facilitate adjustment of the cross-sectional area of the orifice 90. In the exemplary embodiment, the exhaust nozzle orifice 90 is generally annular, however, it should be understood the orifice 90 may be any suitable shape. For example, in an alternative embodiment, the exhaust nozzle orifice 90 is generally rectangular.

During operation of the engine 20, a pressure of the flowpath gases exiting through the exhaust nozzle orifice 90 urges the flap seals 72 against the flaps 70, and more specifically, urges the sealing surfaces 82 of the seals 72 in contact with respective sealing surfaces 78 of the flaps 70. As gases flow through the nozzle assembly 42, and more specifically the exhaust nozzle orifice 90, contact between the sealing surfaces 78 and respective sealing surfaces 82 substantially prevents leakage of gases between the flaps 70 and the flap seals 72.

Figure 4:
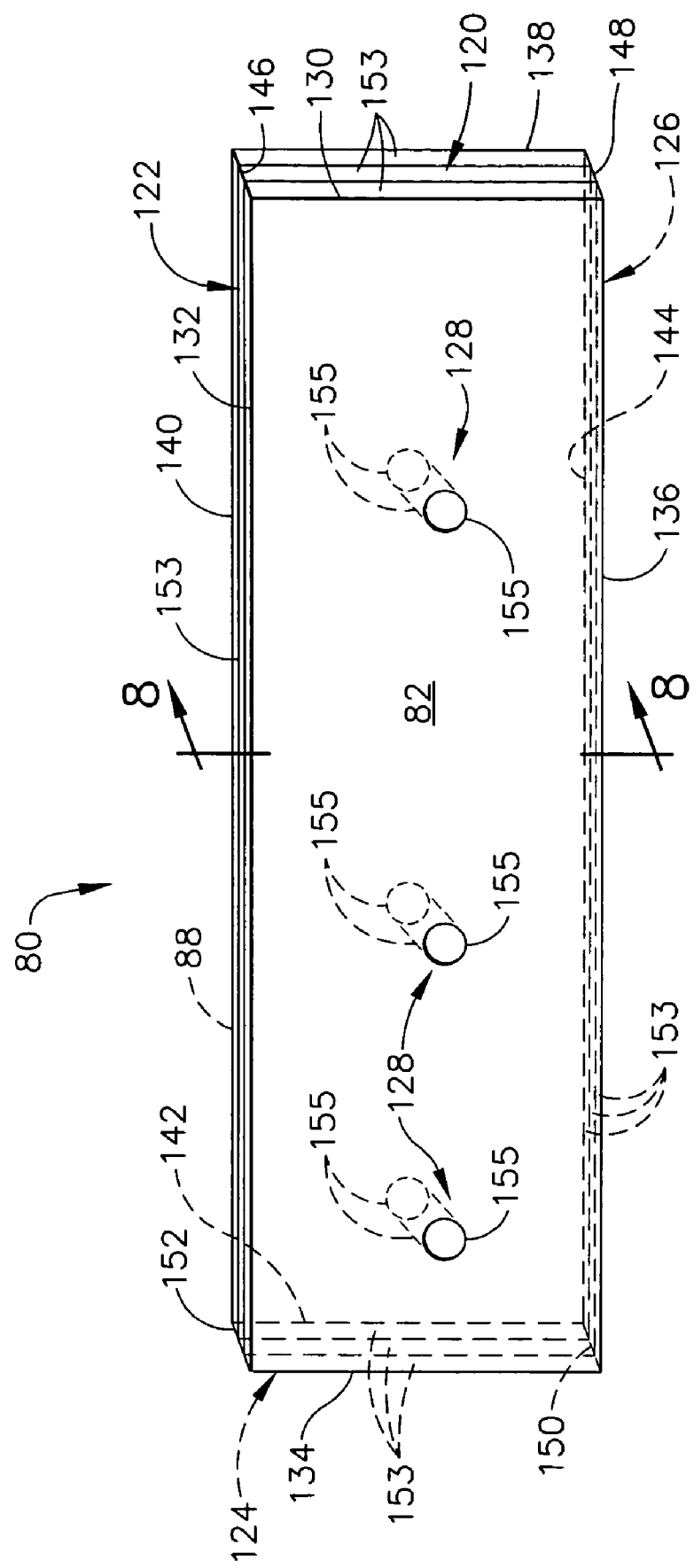
FIG. 4 is a perspective of an exemplary flap seal body for use with the exhaust nozzle assembly shown in FIG. 2.

FIG. 4 is a perspective of an exemplary flap seal body 80 for use with the exhaust nozzle assembly 42 (shown in FIG. 2). The body 80 includes the sealing surface 82 and the radially inner surface 88. In addition to the surfaces 82 and 88, the body 80 includes other surfaces, generally referred to by the reference numerals 120, 122, 124, and 126. Any of the surfaces 82, 88, 120, 122, 124, and 126 may be designated a first surface or a second surface. The body 80 also includes a plurality of openings, generally referred to by the reference numeral 128, for attachment to the mounting assembly 92 (shown in FIG. 3). A plurality of exterior edges 130, 132, 134, 136, 138, 140, 142, 144, 146, 148, 150, and 152 extend between corresponding surfaces 82, 120, 122, 124, 126, and 88 of the body 80. More specifically, the edge 130 is defined at the intersection of the surfaces 82 and 120, the edge 132 is defined at the intersection of the surfaces 82 and 122, the edge 134 is defined at the intersection of the surfaces 82 and 124, and the edge 136 is defined at the intersection of the surfaces 82 and 126. Similarly, the edge 138 is defined at the intersection of the surfaces 88 and 120, the edge 140 is defined at the intersection of the surfaces 88 and 122, the edge 142 is defined at the intersection of the surfaces 88 and 124, and the edge 144 is defined at the intersection of the surfaces 88 and 126. Additionally, the edge 146 is defined at the intersection of the surfaces 120 and 122, the edge 148 is defined at the intersection of the surfaces 120 and 126, the edge 150 is defined at the intersection of the surfaces 124 and 126, and the edge 152 is defined at the intersection of the surfaces 122 and 124.

The body 80 is formed from a plurality of plies 153 each having a plurality of reinforcing fibers (not shown). In one embodiment, each ply 153 is a continuous fiber ply. In another embodiment, each ply is a chopped fiber ply. Additionally, in one embodiment, the reinforcing fibers are silicon carbide fibers. In another embodiment, the reinforcing fibers are oxide fibers, such as Nextel™ 610 or Nextel™ 720, commercially available from 3M company, of St. Paul, Minn. A suitable ceramic matrix mixture is interspersed between the reinforcing fibers of each of the plies 153, and the plies 153 are stacked in face to face relation to form a preform (not shown). Although other ceramic matrix mixtures may be used without departing from the scope of the present invention, in one embodiment, the ceramic matrix mixture is a combination of an alumina powder with a silica yielding polymer. The preform is then laminated to bond the plies 153 and the ceramic matrix mixture together to thereby form the body 80. A mold may be used during stacking of the individual plies 153 and lamination of the preform to control the shape of the body 80. Each ply 153, including the surfaces 82 and 88, includes an interior edge 155 that defines the attachment openings 128 extending through each ply 153 and thus the body 80. The openings 128 may be formed through each ply 153 individually before stacking the plies 153 or may be formed after the plies 153 have been stacked to form the preform.

A variety of methods may be used to intersperse the ceramic matrix mixture between the reinforcing fibers of the plies 153. For example, in one embodiment, each individual reinforcing fiber of each ply 153 is coated with the ceramic matrix material prior to the formation of the individual plies 153, commonly referred to as prepegging. In another embodiment, each individual ply 153 is coated with the ceramic matrix mixture to infuse the ceramic matrix mixture into the individual plies 153 prior to stacking, commonly referred to as wet winding. In yet another embodiment, thin sheets of the ceramic matrix mixture are interleaved between the plies 153 during stacking of the plies 153 and are infused into the plies 153 during lamination, commonly referred to as resin film infusion (RFI). In even another embodiment, after stacking the individual plies 153 to form the preform, the ceramic matrix material is infused into the preform using a suitable infusion process, such as, for example, resin transfer molding (RTM), vacuum assisted resin transfer molding (VARTM), and Seemann composites resin infusion molding (SCRIMP®).

Figure 5:
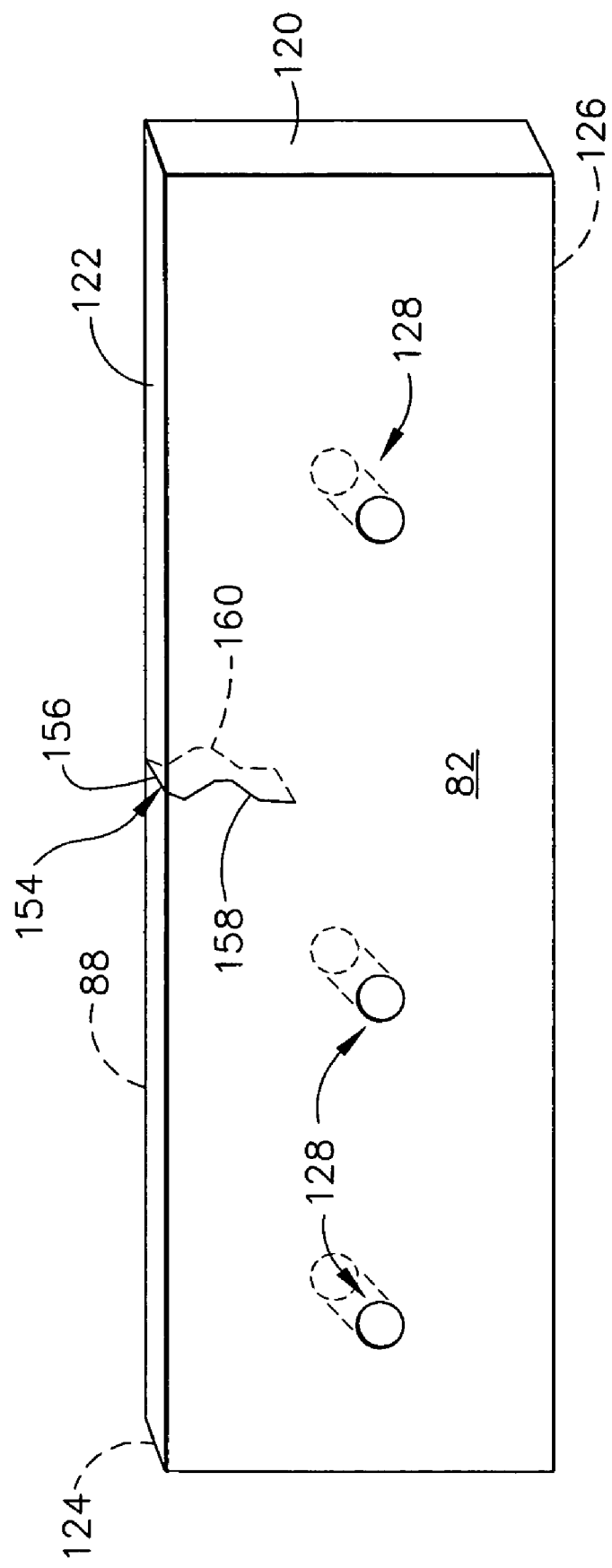
FIG. 5 is a perspective of the flap seal body shown in FIG. 4 having a crack extending therethrough.

FIG. 5 is a perspective of the flap seal body 80, shown in FIG. 4, having a crack, generally referred to by the reference numeral 154, extending therethrough from one surface (e.g., surface 82) to another surface (e.g., surface 88). In the exemplary embodiment, the crack 154 extends between edges 156, 158, and 160 corresponding to surfaces 122, 82, and 88 of the body 80. Also, in the exemplary embodiment, the crack 154 extends completely through the body 80 from the sealing surface 82 to the radially inner surface 88. However, it should be understood that the crack 154 may extend anywhere within the body 80 such that the crack 154 extends between (and not necessarily to) any surfaces of the body 80. The crack 154 may adversely affect the performance and useful life of the flap seal 72. More specifically, the crack 154 may increase a permeability of the body 80, which may result in leakage of gases through the body 80 thereby decreasing an efficiency of the engine 20. Additionally, the crack 154 may facilitate failure of the flap seal 72.

Figure 6:
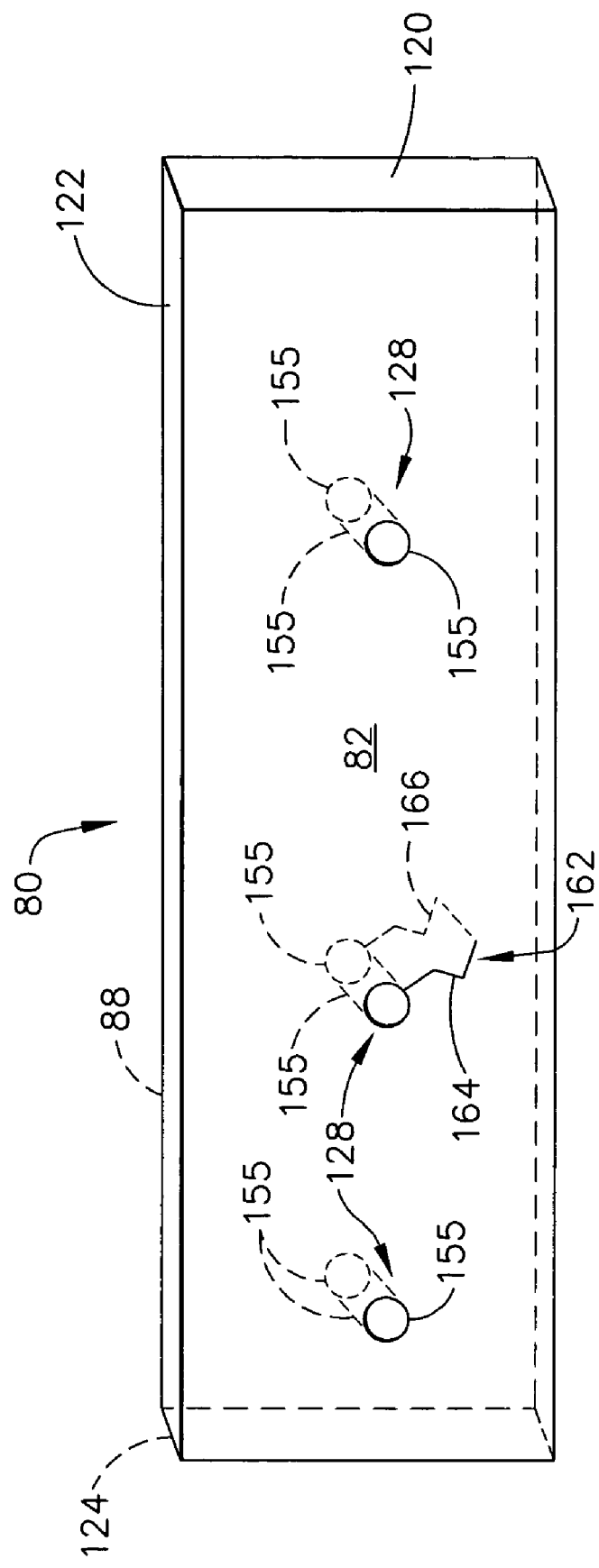
FIG. 6 is another perspective of the flap seal body shown in FIG. 4 having a crack extending therethrough.

FIG. 6 is another perspective of the flap seal body 80, shown in FIG. 4, having a crack, generally referred to by the reference numeral 162, extending therethrough from one surface (e.g., surface 82) to another surface (e.g., surface 88). In the exemplary embodiment, the crack 162 extends between the interior edge 155 defining one of the plurality of openings 128 and edges 164 and 166 corresponding to surfaces 82 and 88 of the body 80. Also, in the exemplary embodiment, the crack 162 extends completely through the body 80 from the sealing surface 82 to the radially inner surface 88. However, it should be understood that the crack 162 may extend anywhere within the body 80 such that the crack 162 extends between (and not necessarily to) any surfaces of the body 80 and an interior edge 155 of one of the plurality of openings 128. The crack 162 may adversely affect the performance and useful life of the flap seal 72. More specifically, the crack 162 may increase a permeability of the body 80, which may result in leakage of gases through the body 80 thereby decreasing an efficiency of the engine 20. Additionally, the crack 162 may facilitate failure of the flap seal 72, and/or may inhibit attachment of the flap seal 72 to the mounting assembly 92 such that the flap seal 72 dislodges from the mounting assembly 92 (FIG. 3) during operation of the engine 20.

Figure 7:
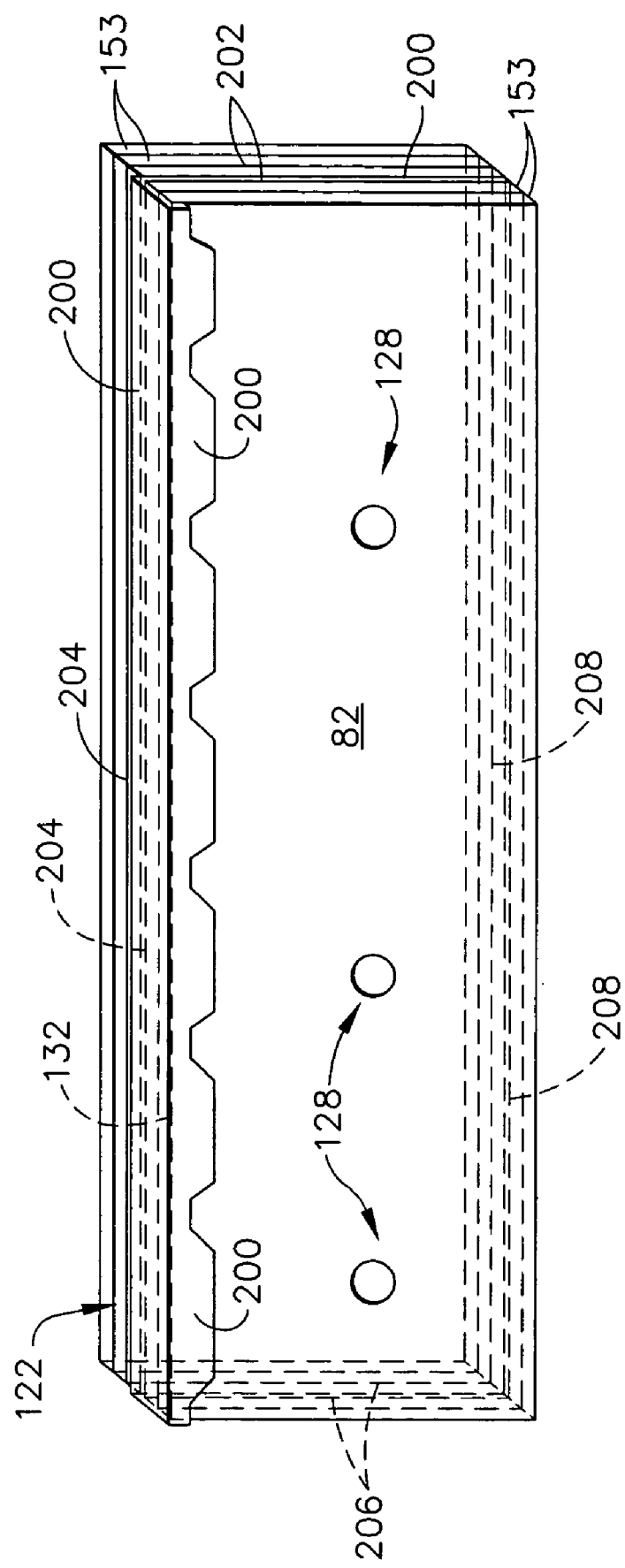
FIG. 7 a perspective of the flap seal body shown in FIG. 4 having an exemplary reinforcement bonded between individual plies of the flap seal body.

FIG. 7 is a perspective of the flap seal body 80 having an exemplary reinforcement 200 bonded between individual plies 153 of the body 80 to prevent, also referred to herein as arrest, a crack (e.g., crack 154 shown in FIG. 5 and/or crack 162 shown in FIG. 6) from propagating further through the body 80. During stacking of the individual plies 153, the reinforcement 200 is positioned between two adjacent plies 153 in the preform, and the reinforcement 200 is bonded together with the plies 153 and the ceramic matrix mixture during lamination. In one embodiment, during stacking of the individual plies 153 a chopped ceramic fiber sheet (not shown) is positioned between the reinforcement and one or both of the plies 153 adjacent the reinforcement 200 to facilitate bonding the reinforcement 200 to the adjacent plies 153. In the exemplary embodiment, the reinforcement 200 extends to a plurality of edges 202, 204, 206, and 208 of each adjacent ply 153. However, it should be understood that the reinforcement 200 may not extend to all or even any of the edges 202, 204, 206, and 208.

In the exemplary embodiment, a portion of the reinforcement 200 is compressed against the surfaces 82 and 122 prior to lamination of the preform such that after lamination a portion of the reinforcement 200 is bonded to the surfaces 82 and 122 and overlaps the edge 132 of the body 80 and the edge 204 of an adjacent ply 153. However, it should be understood that the reinforcement 200 may be positioned such that a portion of the reinforcement 200 overlaps any edge (regardless of whether such edge is referenced herein by a reference numeral) of the body 80 and/or any edge (regardless of whether such edge is referenced herein by a reference numeral) of any of the individual plies 153. In one embodiment, an adhesive is applied to the surfaces 82 and 122 and to the portion of the reinforcement 200 overlapping the surfaces 82 and 122 to facilitate bonding the reinforcement 200 to the surfaces 82 and 122.

The reinforcement 200 may be positioned and bonded between any two adjacent plies 153 in the body 80, and the body 80 may include any number of reinforcements 200. Additionally, the reinforcement 200 has a predetermined ductility that is greater than a predetermined ductility of the body 80, and more specifically the bonded plies 153 and ceramic matrix mixture. In one embodiment, the flap seal body 80, and more specifically the bonded plies 153 and ceramic matrix mixture, has a substantially uniform ductility throughout that is less than the predetermined ductility of the reinforcement 200. The greater ductility of the reinforcement 200 with respect to the body 80 prevents a crack (e.g., crack 154 shown in FIG. 5 and/or crack 162 shown in FIG. 6) from propagating through the body 80 by reinforcing the body 80 adjacent a portion of the body 80 where a crack may form.

In the exemplary embodiment, the reinforcement 200 is a metallic wire mesh, however, it should be understood that the reinforcement may be any material, and may be fabricated in any material configuration, having a ductility greater than a predetermined ductility of the body 80, and more specifically a portion of the bonded plies 153 and ceramic matrix mixture that is adjacent the reinforcement 200. In one embodiment, the reinforcement 200 is a metallic wire mesh fabricated from a nickel-based alloy, such as, for example, HAYNES® HASTELLOY X™ alloy, commercially available from Haynes International, Inc., Kokomo, Ind. In another embodiment, the reinforcement 200 is a metallic wire mesh fabricated from a cobalt-based alloy, such as, for example, HAYNES® alloy 230, commercially available from Haynes International, Inc., Kokomo, Ind. In yet another embodiment, the reinforcement 200 is a metallic wire mesh fabricated from stainless steel, such as, for example, stainless steel grade 316 commercially available from Cleveland Wire Cloth, Cleveland, Ohio.

Figure 8:
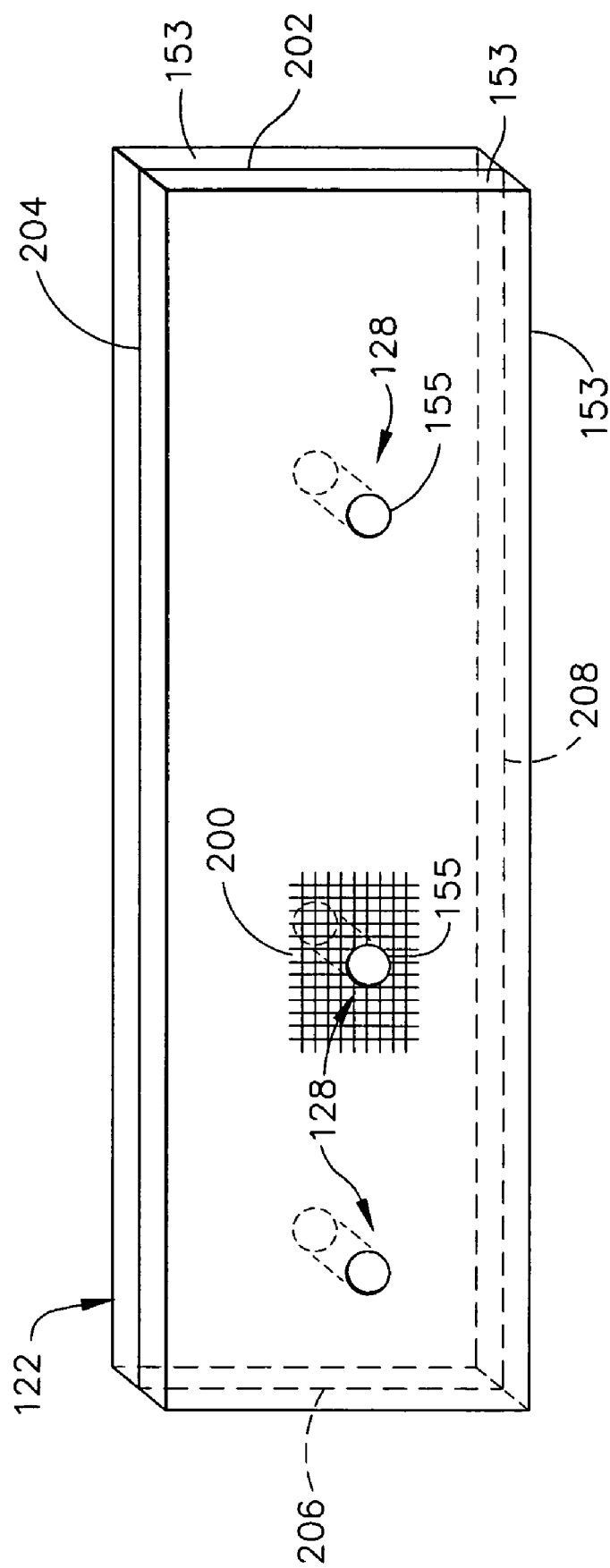
FIG. 8 is a cross-section of the flap seal body shown in FIG. 4 taken along line 8—8 of FIG. 4 illustrating another exemplary reinforcement bonded between individual plies of the flap seal body.

As discussed above, the reinforcement 200 may not extend to any of the edges 202, 204, 206, and 208 of the plies 153, and may overlap any edge of the body 80. For example, as illustrated in FIG. 8 the reinforcement 200 may be positioned within the preform such that the reinforcement overlaps the interior edge 155 defining one of the openings 128 within an individual ply 153.

The above-described reinforcement is cost-effective and reliable for arresting the propagation of a crack through a ceramic matrix composite material. More specifically, the reinforcement facilitates reinforcing a portion of the ceramic matrix composite material where a crack may form to arrest the propagation of the crack through the ceramic matrix composite material. As a result, the reinforcement may increase the performance and useful life of the ceramic matrix composite material, and thereby reduce replacement costs. Additionally, the reinforcement may increase a wear resistance and a strain to failure ratio of the ceramic matrix composite material, and may allow the ceramic matrix composite material to experience higher thermal gradients without failing. In the exemplary embodiment, the reinforcement facilitates increasing the performance and useful life of a gas turbine engine exhaust seal. As a result, the exemplary reinforcement facilitates reducing a number of exhaust nozzle seals that are replaced within a gas turbine engine to maintain a desired operational efficiency of the engine.

Although the invention is herein described and illustrated in association with a gas turbine engine, and more specifically, in association with an exhaust nozzle seal for use with a gas turbine engine, it should be understood that the present invention is applicable to any ceramic matrix composite material. Accordingly, practice of the present invention is not limited to gas turbine engine exhaust nozzle seals nor gas turbine engines generally. Additionally, practice of the present invention is not limited to gas turbine engine exhaust nozzle seals that are fabricated from ceramic matrix composite materials. Rather, it should be understood that the present invention is applicable to gas turbine engine seals that are fabricated from materials other than ceramic matrix composite materials.

Exemplary embodiments of gas turbine engine exhaust nozzle assemblies are described above in detail. The assemblies are not limited to the specific embodiments described herein, but rather, components of each assembly may be utilized independently and separately from other components described herein. Each exhaust nozzle assembly component can also be used in combination with other exhaust nozzle assembly components.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A variable geometry exhaust nozzle for a gas turbine engine having an exhaust centerline, said nozzle comprising:
   a plurality of flaps arranged around the exhaust centerline, each of said flaps having a sealing surface; and
   a plurality of flap seals, each of said seals having a body including a sealing surface and being positioned between a pair of flaps of said plurality of flaps so that the sealing surface of the seal engages the sealing surface of at least one of said adjacent flaps, each of said bodies including a plurality of plies stacked and bonded together,
   wherein at least one of said seal bodies has a reinforcement bonded to said body so that at least a portion of said reinforcement is positioned between two adjacent plies in said body, and
   wherein at least one seal body includes an interior edge defining an opening extending through at least one ply of said plurality of plies and said reinforcement is bonded to said body so that said reinforcement overlaps at least a portion of said interior edge.

2. A variable geometry exhaust nozzle in accordance with claim 1 wherein said seal bodies comprise an oxide-based ceramic matrix composite material.

3. A variable geometry exhaust nozzle in accordance with claim 1 wherein said reinforcement comprises a metallic wire mesh.

4. A variable geometry exhaust nozzle in accordance with claim 3 wherein said metallic wire mesh comprises at least one of a nickel-based alloy, a cobalt-based alloy, and a stainless steel.

5. A variable geometry exhaust nozzle in accordance with claim 1 wherein said reinforcement is bonded to said seal body so that said reinforcement overlaps at least a portion of an edge of a ply of said plurality of plies of said body.

6. A variable geometry exhaust nozzle in accordance with claim 1 wherein said reinforcement is bonded to said seal body so that said reinforcement extends to an edge of a ply of said plurality of plies of said body.

7. A variable geometry exhaust nozzle for a gas turbine engine having an exhaust centerline, said nozzle comprising:
   a plurality of flaps arranged around the exhaust centerline, each of said flaps having a sealing surface; and
   a plurality of flap seals, each of said seals having a body including a sealing surface and being positioned between a pair of flaps of said plurality of flaps so that the sealing surface of the seal engages the sealing surface of at least one of said adjacent flaps, each of said bodies including a plurality of plies stacked and bonded together,
   wherein at least one of said seal bodies has a reinforcement bonded to said body so that at least a portion of said reinforcement is positioned between two adjacent plies in said body and overlaps at least a portion of an edge of a ply of said plurality of plies of said body.

8. A variable geometry exhaust nozzle in accordance with claim 7 wherein said seal bodies comprise an oxide-based ceramic matrix composite material.

9. A variable geometry exhaust nozzle in accordance with claim 7 wherein said reinforcement comprises a metallic wire mesh.

10. A variable geometry exhaust nozzle in accordance with claim 9 wherein said metallic wire mesh comprises at least one of a nickel-based alloy, a cobalt-based alloy, and a stainless steel.

11. A variable geometry exhaust nozzle in accordance with claim 7 wherein said reinforcement is bonded to said seal body so that said reinforcement extends to an edge of a ply of said plurality of plies of said body.

12. A variable geometry exhaust nozzle for a gas turbine engine having an exhaust centerline, said nozzle comprising:
    a plurality of flaps arranged around the exhaust centerline, each of said flaps having a sealing surface; and
    a plurality of flap seals, each of said seals having a body including a sealing surface and being positioned between a pair of flaps of said plurality of flaps so that the sealing surface of the seal engages the sealing surface of at least one of said adjacent flaps, each of said bodies including a plurality of plies stacked and bonded together,
    wherein at least one of said seal bodies has a reinforcement bonded to said body so that at least a portion of said reinforcement is positioned between two adjacent plies in said body and wraps around at least a portion of an edge of at least one ply of said plurality of plies of said body.

13. A variable geometry exhaust nozzle in accordance with claim 12 wherein said seal bodies comprise an oxide-based ceramic matrix composite material.

14. A variable geometry exhaust nozzle in accordance with claim 12 wherein said reinforcement comprises a metallic wire mesh.

15. A variable geometry exhaust nozzle in accordance with claim 14 wherein said metallic wire mesh comprises at least one of a nickel-based alloy, a cobalt-based alloy, and a stainless steel.

16. A variable geometry exhaust nozzle in accordance with claim 12 wherein said reinforcement is bonded to said seal body so that said reinforcement extends to an edge of a ply of said plurality of plies of said body.

* * * * *